United States Patent [19]

Loane, Jr. et al.

[11] 4,204,864

[45] May 27, 1980

[54] PARTICULATE SLAGGING COMPOSITION FOR THE CONTINUOUS CASTING OF STEEL

[75] Inventors: Charles M. Loane, Jr., Bel Air, Md.; Martin L. Hoss, Parma, Ohio

[73] Assignee: SCM Corporation, Cleveland, Ohio

[21] Appl. No.: 10,028

[22] Filed: Feb. 7, 1979

Related U.S. Application Data

[63] Continuation-in-part of Ser. No. 897,717, Apr. 19, 1978, abandoned.

[51] Int. Cl.$^2$ .......................... C22B 9/10; C21C 7/00
[52] U.S. Cl. ........................................ 75/257; 75/53; 164/82
[58] Field of Search ............................ 75/257, 53–58; 148/26; 164/82

[56] References Cited

U.S. PATENT DOCUMENTS

| | | | |
|---|---|---|---|
| 3,309,196 | 3/1967 | Kaneko | 75/53 |
| 3,649,249 | 3/1972 | Halley | 148/26 |
| 3,704,744 | 12/1972 | Halley | 75/257 |
| 3,899,324 | 8/1975 | Corbett | 148/26 |
| 4,092,159 | 5/1978 | Uher | 75/257 |

*Primary Examiner*—P. D. Rosenberg
*Attorney, Agent, or Firm*—Merton H. Douthitt; Joseph M. Hageman

[57] ABSTRACT

A particulate slagging composition of glass network formers and fluxing agents therefor serving as a protective layer on the top of a pool of molten steel at the upper end of an open-ended continuous casting mold. Such particulate slagging composition is characterized by the absence of lithium, the inclusion of at least about ½ weight percent potassium oxide equivalent, and the flowidity and fusion range upon melting suitable for the continuous casting of a steel.

14 Claims, No Drawings

PARTICULATE SLAGGING COMPOSITION FOR THE CONTINUOUS CASTING OF STEEL

This application is a continuation-in-part of copending application Ser. No. 897,717 filed Apr. 19, 1978, now abandoned.

BACKGROUND OF THE INVENTION

A variety of fluxes, also sometimes referred to as "mold powders" or "slags", have been proposed for the continuous casting of steels, a fairly recent development in steel mill practice. Such materials protect the molten metal from air oxidation while usually fluxing or solubilizing and thereby removing some oxide impurities present in the melt. Additionally, lubrication of the mold often can be enhanced by the use of such materials. Typically, the material is fed or poured on the top surface of the molten metal. Occasionally this top surface is referred to as the "meniscus".

Steels now continuously cast in production operations include various aluminum-killed steel, silicon-killed steel and austenitic stainless steels. One type of material consists essentially of particulates of vitrified (i.e., fritted) glass material. Such materials shown in U.S. Pat. Nos. 3,649,249, 3,704,744, and 3,899,324 require lithium and halogen, especially fluorine. All the exemplified vitreous fluxes shown in U.S. Pat. No. 3,926,246 and U.S. Pat. No. 4,092,159 contain lithium, including best mode examples, although lithium is broadly optional in such flux. Said reference application features a portion of its fluorine-providing material mixed unfritted with the balance of the glass formers (which are fritted) to minimize smelter attack.

In the trade the terms "flux" and "slag" often have been used interchangeably for fritted or preponderantly fritted mold powders in continuous casting service. For convenience, a particulate slagging composition will be defined as encompassing all types of material used to protect and lubricate steel during continuous casting. A "vitrifcation" will be defined as a totally vitrified (fritted) material or mixture of fritted materials for the instant purpose, whereas a "flux" will be a vitrifaction to which there is added nonvitrified material in small proportion, that is, less than about 30 percent of the total flux. Separate from both flux and vitrifaction, are mold powders which shall be defined as essentially raw materials which have not been vitrified to any appreciable extent. Typically, the instant vitrifactions without carbon are made by comminuting the vitrified component or components, then blending if necessary. A portion of fluorine-providing material in unvitrified state, such as calcium fluoride, can be added to such vitrifaction (if all of the fluorine-providing material has not been smelted-in with the rest of the batch). Ordinarily from 1 to 10 percent and preferably 1 to 5 percent by weight of powdered graphite is added to make the final continuous casting flux products, such graphite being for the purpose of minimizing heat loss from the surface of the molten metal.

An obvious advantage of the instant particulate slagging composition is the avoidance of lithium, which is a comparatively costly ingredient. An unexpected advantage is a product that appears to have a quite desirable and relatively slower rate of heat transfer; this can give a more perfect cast product as the scale of the casting operation is enlarged.

Heretofore most of the vitrifactions made have been for use in porcelain enameling and chinaware glazing wherein potassium oxide, a fimiliar ingredient, was considered functionally substantially the equivalent of sodium oxide, although more costly. Surprisingly, it has been found in connection with the instant invention (when no lithium is present) that the at least small proportion of potassium oxide and the potassium oxide/sodium oxide ratio are necessary for increasing the flowidity and lowering the fusion point of the mixture for the continuous casting of steels. The calcium fluoride often used by the porcelain enamel formulator to increase fluidity of his frit does not seem to give anywhere near as much change in the instant vitrifactions.

Another type of particulate slagging compositions consists essentially of unsmelted, unvitrified raw materials as noted in the earlier definition of mold powder. Such materials shown in the copending U.S. patent application Ser. No. 919,601 of Joseph F. Uher do not avoid the inclusion of lithium and fluorine, since both are broadly optional. The same problems with lithium noted earlier will again result.

BROAD STATEMENT OF THE INVENTION

One aspect of this invention is a particulate slagging composition of glass network formers and fluxing agents therefor, said composition characterized by the absence of lithium, and the flowidity and fusion range upon melting suitable for the continuous casting of a steel, the theoretical net oxide analysis values of said composition being within the following ranges:

| Oxide | Weight Percent | |
|---|---|---|
| $K_2O$ | 0.5–6 | with the proviso that the weight ratio of $K_2O/Na_2O$ is between 1:2.5 and 1:20 and the Group 1A metal oxides do not exceed 35% |
| $Na_2O$ | 10–30 | |
| CaO | 20–41 | with the proviso that the Group 2A metal oxides do not exceed 41% |
| MgO | 0–10 | |
| BaO | 0–5 | |
| SrO | 0–5 | |
| $TiO_2$ | 0–4 | |
| $ZrO_2$ | 0–3 | |
| Oxide of a Period IV. metal having atomic No. of 23–28, inclusive | 0–6 | |
| F (elemental component of the fluorine-providing materials) | 0–16 | |
| $SiO_2$ | 25–45 | with the proviso that these glass network formers do not exceed 45 percent |
| $B_2O_3$ | 0–10 | |
| $Al_2O_3$ | 0–8 | | wherein the percentages are selected to total 100 percent.

Another aspect of this invention is the improvement in process for the continuous casting of a steel wherein a pool of molten steel is maintained in the upper end of an open-ended continuous casting mold, said improvement comprising establishing and maintaining on the top of said pool a protective layer of the particulate slagging composition of the theoretical net oxide analysis listed above blended with a small proportion of elemental carbon.

DETAILED DESCRIPTION OF THE INVENTION

The vitrifaction or vitrified fraction of the instant invention is made conventionally in a smelter or the like. Molten glass from the smelter conventionally is fritted by pouring a stream of it into water or by fracturing it subsequent to its passage between chilled rolls. Often the resulting frit is milled (ground) to pass 150 mesh (Tyler Standard) or finer for use in continuous casting.

Such frit basically is made from glass network formers and fluxing agents therefor. Principal glass network formers include silica, boria, and alumina. Phosphorus pentoxide also is a useful glass network former, but less desirable for steel fluxing, particularly with particulate slagging compositions of this invention. Principal fluxing oxides are Group 1A and Group 2A metal oxides, typically, potassium oxide, sodium oxide, calcium oxide, magnesium oxide, strontium oxide, and barium oxide.

In the proportions they are used in the present compositions titania, zirconia, and the oxides of Period IV metals having atomic number of 23-28, inclusive, (iron oxide, usually reckoned as ferric oxide, and the oxides of cobalt, manganese, chromium, vanadium, and nickel) act as fluxes, although some people prefer to consider them as glass modifiers, particularly when they are used in a greater proportion. Fluorine acts to dissolve alumina and also to flux generally. However, fluorine-providing materials are both expensive and potentially deleterious to worker's health if their fumes are allowed to unduly concentrate over the caster head. The vitrified parts of the instant flux can be one or a plurality of frits. In the latter case the frits can be agglomerated, such as by sintering. However, mere mechanical mixing of the frits is adequate and preferred. The raw glass batch for the vitrified portion of the flux, namely the vitrifaction, usually is in the form of minerals and chemicals of purity satisfactory for glass making; this is a prudent criterion. The fluorine-providing material can be simple or complex fluoride salts, typically fluorspar, cryolite, alkaline earth metal fluorides, and alkali metal fluosilicates. For use with steel a preferred and most practical fluorine-providing raw material is fluorspar, either synthetic or natural.

Examples 29 through 42 below illustrated the acceptable quality of results obtained for use in casting certain steel when the amount of fluorine present in the net oxide analysis is kept low or entirely eliminated. The fluxing role fluorine usually plays in materials used in continuous casting where the fluorine content has not been purposefully limited is apparently taken over by the $K_2O$ and $Na_2O$ when those two oxides are present in the proper proportions.

The principal glass network former used is silica. For use in continuous casting of silicon-killed steel or stainless steel often it is preferred to include a portion of alumina to keep the flux from being too fluid during the continuous casting operation. If the material is in a situation to pick up alumina, it will gain in viscosity, as for example when it is used in the continuous casting of an aluminum-killed steel. In such case little or no alumina is used because the melted material gains some alumina and increases in viscosity during use.

An alternate method of practicing this invention is a mold powder made by intimately mechanical blending of the particulate raw batch components set forth in Examples 39 through 42. The particles of the components are not greater than about 100 mesh in size (Tyler Sieve Series). The blend may be heated to some extent, but not to the extent that the components start to fuse together and start to form a vitrifaction. However, when the mold powder is placed on the molten pool of steel in the caster, the mold powder should melt without residue and thereby avoid the presence of igneous byproducts which cause surface defects on the steel cast. The big advantage of a mold powder over a vitrifaction or flux is the lower cost due to the fact that smelting of the raw batch components is no longer required before use in casting.

Different properties of the instant particulate slagging compositions were measured by specific tests. Smelting temperatures were taken by means of an optical pyrometer. The smelting temperatures were taken at the end of 14 minutes. Flowidity was measured by the method set out in U.S. Pat. No. 3,649,249. Alumina dissolution kinetics and fusion ranges were measured by special tests, the procedures for which are explained after the following examples.

Different types of steel to be cast with the particulate slagging compositions worked better when the compositions had certain measured properties. Fusion range temperatures, as long as the upper limits were below the lowest temperatures of the steel to be cast with the particular composition, did not affect the process of casting. A margin of safety of at least a couple of hundred degrees Fahrenheit is preferred. However, the type of killed steel is important in selecting the particulate slagging compositions with the right values for alumina dissolution kinetics and flowidity. In the case of aluminum-killed steel the flowidity value must be over 3, but not over 20. The alumina dissolution kinetics should be in the lower end of the values for the composition. For austenitic stainless steels and silicon-killed steels, the flowidity values of the particulate slagging composition can be lower than 3, and its alumina dissolution characteristics ordinarily need not be as high; thus the value in seconds for its "alumina dissolution kinetics" in such instance can be a high number.

The following examples show ways in which the invention has been practiced, but should not be construed as limiting the invention. In this application, unless otherwise especially noted, all parts are parts by weight, all percentages are weight percentages, all temperatures are in degrees Fahrenheit, with Celsius temperatures in parentheses, and all particle sizes are according to the Tyler Standard Sieve Series.

EXAMPLE 1

Frit was prepared by conventionally dry-mixing, fusing, and water quenching conventional raw batch ingredients listed to yield frit of the following theory analysis:

| Oxide | Percent by Weight |
|---|---|
| $K_2O$ | 0.9 |
| $Na_2O$ | 11.8 |
| CaO | 34.8 |
| MgO | 1.0 |
| $Fe_2O_3$ | 2.3 |
| F | 11.2 |
| $SiO_2$ | 30.8 |

| | |
|---|---|
| Al₂O₃ | 7.3 |

| Raw Batch Composition | |
|---|---|
| Ingredient | Weight Parts |
| Silica | 568 |
| Sodium Carbonate | 508 |
| Fluorspar (CaF₂) | 595 |
| CaCO₃ | 838 |
| Ferric Oxide | 58 |
| Kaolin | 458 |
| Potassium Carbonate | 32 |
| Magnesia | 25 |

In a batch smelt, the final temperature after 14 minutes of smelting was 2280° F. (1249° C.). The flowidity of the vitrifaction was 4¼ inches. The fusion range of the vitrifaction was 2050°–2150° F. (1121°–1177° C.). The alumina dissolution kinetics of the vitrifaction were 520 seconds. These properties made the vitrifaction a good one for use in the continuous casting of austenitic stainless steel and silicon-killed steel.

EXAMPLES 2–7, inclusive

Frits were prepared by conventionally dry-mixing, fusing, and water quenching conventional raw batch ingredients listed to yield frit of the following theory analysis:

| Example | 2 | 3 | 4 | 5 | 6 | 7 |
|---|---|---|---|---|---|---|
| Oxides (Percent by Weight) | | | | | | |
| K₂O | 5.1 | 5 | 5 | 4.9 | 5.1 | 7.5 |
| Na₂O | 24.4 | 24.1 | 23.9 | 23.7 | 24.4 | 23.0 |
| CaO | 25.7 | 26.4 | 27.2 | 27.9 | 28.7 | 27.1 |
| F | 11.5 | 11.4 | 11.3 | 11.2 | 11.5 | 10.9 |
| SiO₂ | 33.4 | 33.0 | 32.7 | 32.4 | 30.4 | 31.4 |
| Raw Batch Composition Ingredients (Weight Parts) | | | | | | |
| Silica | 852 | 852 | 852 | 852 | 775 | 852 |
| Sodium Carbonate | 1068 | 1068 | 1068 | 1068 | 1068 | 1068 |
| Fluorspar (CaF₂) | 620 | 620 | 620 | 620 | 620 | 620 |
| CaCO₃ | 404 | 451 | 498 | 545 | 545 | 545 |
| Potassium Carbonate | 191 | 191 | 191 | 191 | 191 | 301 |
| Batch Smelt Final Temperature in °F. (°C. below) (after 14 minutes) | | | | | | |
| | 1980° F. | 1980 | 2000 | 2020 | 2000 | 2000 |
| | (1082° C.) | (1082) | (1093) | (1104) | (1093) | (1104) |
| Flowidity, in inches | | | | | | |
| | 8 | 7½ | 7⅜ | 7 | 10½ | 10¾ |
| Fusion Range of the Vitrifaction (°F.) (°C. below) | | | | | | |
| | (1825°– | (1825– | (1825– | (1825– | (1775– | (1775– |
| | 1900° F.) | 1950) | 1950) | 1900) | 1850) | 1825) |
| | (996°– | (996– | (996– | (996– | (968– | (968– |
| | 1037° C.) | 1066) | 1066) | 1037) | 1010) | 996) |
| Alumina Dissolution Kinetics, in seconds | | | | | | |
| | 412 | 350 | 279 | 308 | 330 | 338 |

The properties of these frits indicate that they would be useful for fluxing aluminum-killed steel.

EXAMPLES 8–11, inclusive

Frits were prepared by conventionally dry-mixing, fusing, and water quenching conventional raw batch ingredients listed to yield frit of the following theory analysis:

| Example | 8 | 9 | 10 | 11 |
|---|---|---|---|---|
| Oxides (Percent by Weight) | | | | |
| K₂O | 3.4 | 3.3 | 3.1 | 3.2 |
| Na₂O | 22.4 | 26.6 | 25.0 | 27.4 |
| CaO | 30.0 | 26.4 | 30.7 | 28.0 |
| F | 14.5 | 14.3 | 13.4 | 13.5 |
| SiO₂ | 29.6 | 29.2 | 27.5 | 27.7 |
| Raw Batch Composition Ingredients (Weight Parts) | | | | |
| Silica | 750 | 750 | 750 | 750 |
| Sodium Carbonate | 968 | 1168 | 1168 | 1268 |
| Fluorspar (CaF₂) | 770 | 770 | 770 | 770 |
| CaCO₃ | 400 | 250 | 550 | 400 |
| Potassium Carbonate | 125 | 125 | 125 | 125 |
| Batch Smelt Final Temperature in °F. (°C.) (after 14 minutes) | | | | |
| | 2000° F. | 2000 | 2000 | 2040 |
| | (1093° C.) | (1093) | (1093) | (1116) |
| Flowidity, in inches | | | | |
| | 11½ | 12¼ | 14 | 12¾ |
| Fusion Range of the Vitrifaction in °F. (°C.) | | | | |
| | (1825°– | (1775– | (1750– | (1750– |
| | 1950° F.) | 1850) | 1850) | 1825) |
| | (996°– | (968– | (954– | (954– |
| | 1066° C.) | 1010) | 1010) | 996) |
| Alumina Dissolution Kinetics, in seconds | | | | |
| | 155 | 170 | 140 | 225 |

The properties of these frits indicate that they would be useful for fluxing aluminum-killed steel.

EXAMPLES 12–15, inclusive

More frits were prepared by conventionally dry-mixing, fusing, and water quenching conventional raw batch ingredients listed to yield frits of the following theory analysis:

| Example | 12 | 13 | 14 | 15 |
|---|---|---|---|---|
| Oxides (Percent by Weight) | | | | |
| K₂O | 3.4 | 3.1 | 3.0 | 3.4 |
| Na₂O | 20.1 | 22.9 | 26.1 | 20.4 |
| CaO | 30.1 | 30.8 | 29.6 | 27.2 |
| F | 14.5 | 13.4 | 12.9 | 14.7 |
| SiO₂ | 31.7 | 29.4 | 28.2 | 34.1 |
| Raw Batch Composition Ingredients (Weight Parts) | | | | |
| Silica | 800 | 800 | 800 | 850 |
| Sodium Carbonate | 868 | 1068 | 1268 | 868 |
| Fluorspar (CaF₂) | 770 | 770 | 770 | 770 |
| CaCO₃ | 400 | 550 | 550 | 250 |
| Potassium Carbonate | 125 | 125 | 125 | 125 |
| Batch Smelt Final Temperature in °F. (°C.) (after 14 minutes) | | | | |
| | 2000° F. | 2000 | 2000 | 2020 |
| | (1093° C.) | (1093) | (1093) | (1104) |
| Flowidity, in inches | | | | |
| | 9 | 11½ | 12¾ | 5¼ |
| Fusion Range of the Vitrifaction in °F. (°C.) | | | | |
| | (1850°– | (1800– | (1775– | (1750– |
| | 1900° F.) | 1900) | 1900) | 1850) |
| | (1010°– | (982– | (968– | (954– |
| | 1038° C.) | 1038) | 1038) | 1010) |
| Alumina Dissolution Kinetics, in seconds | | | | |
| | 160 | 160 | 145 | 170 |

The properties of these frits indicate that they would be useful for fluxing aluminum-killed steel.

EXAMPLES 16–19, inclusive

More frits were prepared by conventionally dry-mixing, fusing, and water quenching conventional raw batch ingredients listed to yield frits of the following theory analysis:

| Example | 16 | 17 | 18 | 19 |
|---|---|---|---|---|
| Oxides (Percent by Weight) | | | | |
| $K_2O$ | 3.1 | 3.1 | 3.1 | 2.9 |
| $Na_2O$ | 27.2 | 26.7 | 20.7 | 25.5 |
| CaO | 24.9 | 24.4 | 27.7 | 26.1 |
| F | 13.4 | 13.2 | 13.4 | 12.6 |
| $SiO_2$ | 31.2 | 32.5 | 34.8 | 32.7 |
| Raw Batch Composition Ingredients (Weight Parts) | | | | |
| Silica | 850 | 900 | 950 | 950 |
| Sodium Carbonate | 1268 | 1268 | 968 | 1268 |
| Fluorspar ($CaF_2$) | 770 | 770 | 770 | 770 |
| $CaCO_3$ | 250 | 250 | 400 | 400 |
| Potassium Carbonate | 125 | 125 | 125 | 125 |
| Batch Smelt Final Temperature in °F. (°C.) (after 14 minutes) | | | | |
| | 2000° F. | 2000 | 2020 | 2000 |
| | (1093° C.) | (1093) | (1104) | (1093) |
| Flowidity, in inches | | | | |
| | 8¼ | 7¾ | 6 | 9 |
| Fusion Range of the Vitrifaction in °F. (°C.) | | | | |
| | (1825°– | (1825– | (1825– | (1825– |
| | 1900° F.) | 1900) | 1900) | 1925) |
| | (996°– | (996– | (996– | (996– |
| | 1038° C.) | 1038) | 1038) | 1052) |
| Alumina Dissolution Kinetics, in seconds | | | | |
| | 150 | 280 | 200 | 170 |

The properties of these frits indicate that they would be useful for fluxing aluminum-killed steel.

EXAMPLES 20–23, inclusive

More frits were prepared by conventionally dry-mixing, fusing, and water quenching conventional raw batch ingredients listed to yield frits of the following theory analysis:

| Example | 20 | 21 | 22 | 23 |
|---|---|---|---|---|
| Oxides (Percent by Weight) | | | | |
| $K_2O$ | 2.2 | 3.3 | 3.6 | 3.5 |
| $Na_2O$ | 21.4 | 21.9 | 21.4 | 21.0 |
| CaO | 26.7 | 22.5 | 23.8 | 25.1 |
| F | 9.5 | 11.2 | 11.0 | 10.8 |
| $SiO_2$ | 40.3 | 41.1 | 40.3 | 39.6 |
| Raw Batch Composition Ingredients (Weight Parts) | | | | |
| Silica | 950 | 950 | 950 | 950 |
| Sodium Carbonate | 868 | 868 | 868 | 868 |
| Fluorspar ($CaF_2$) | 470 | 545 | 545 | 545 |
| $CaCO_3$ | 550 | 250 | 325 | 400 |
| Potassium Carbonate | 75 | 112.5 | 125 | 125 |
| Batch Smelt Final Temperature in °F. (°C.) (after 14 minutes) | | | | |
| | 2140° F. | 2140 | 2140 | 2120 |
| | (1171° C.) | (1171) | (1171) | (1160) |
| Flowidity, in inches | | | | |
| | 4¼ | 4¼ | 4½ | 4½ |
| Fusion Range of the Vitrifaction in °F. (°C.) | | | | |
| | (1925°– | (1825– | (1825– | (1875– |
| | 2050° F.) | 1950) | 1950) | 2000) |
| | (1052°– | (996– | (996– | (1024– |
| | 1121° C.) | 1066) | 1066) | 1093) |
| Alumina Dissolution Kinetics, in seconds | | | | |
| | 440 | 490 | 460 | 440 |

The properties of these frits indicate that they would be useful for fluxing austenitic stainless or silicon-killed steel.

EXAMPLE 24

Frit was prepared by conventionally dry-mixing, fusing, and water quenching conventional raw batch ingredients listed to yield frit of the following theory analysis:

| Example | 24 |
|---|---|
| Oxides (Percent by Weight) | |
| $K_2O$ | 3.3 |
| $Na_2O$ | 20.0 |
| CaO | 27.5 |
| F | 11.6 |
| $SiO_2$ | 37.6 |
| Raw Batch Composition Ingredients (Weight Parts) | |
| Silica | 950 |
| Sodium Carbonate | 868 |
| Fluorspar ($CaF_3$) | 620 |
| $CaCO_3$ | 475 |
| Potassium Carbonate | 125 |
| Batch Smelt Final Temperature in °F. (°C.) (after 14 minutes) | |
| | 2120 |
| | (1160) |
| Flowidity, in inches | |
| | 5¼ |
| Fusion Range of the Vitrifaction in °F. (°C.) | |
| | (1900°– |
| | 2000° F.) |
| | (1038°– |
| | 1093° C.) |
| Alumina Dissolution Kinetics, in seconds | |
| | 440 |

The property of the frit indicates that it would be useful for fluxing austenitic stainless or silicon-killed steel.

EXAMPLES 25–28, inclusive

These additional frits differed from the previous examples by the presence of other oxides, sometimes due to the addition of boric acid to the raw batch. The examples were prepared by conventionally dry-mixing, fusing, and water quenching conventional raw batch ingredients listed to yield frits of the following theory analysis:

| Example | 25 | 26 | 27 | 28 |
|---|---|---|---|---|
| Oxides (Percent by Weight) | | | | |
| $K_2O$ | 5.7 | 5.6 | 2.8 | 5.9 |
| $Na_2O$ | 23.2 | 22.8 | 24.4 | 23.7 |
| CaO | 27.4 | 26.9 | 26.2 | 27.9 |
| F | 11.0 | 10.8 | 12.0 | 11.4 |
| $SiO_2$ | 29.9 | 29.4 | 34.4 | 30.8 |
| $B_2O_3$ | 2.8 | 4.6 | — | — |
| $Al_2O_3$ | — | — | 0.07 | — |
| MgO | — | — | 0.14 | — |
| Raw Batch Composition Ingredients (Weight Parts) | | | | |
| Silica | 801 | 801 | 928 | 801 |
| Sodium Carbonate | 1068 | 1068 | 1140 | 1068 |
| Fluorspar ($CaF_2$) | 620 | 620 | 675 | 620 |
| Boric Acid | 133 | 222 | — | — |
| $CaCO_3$ | 545 | 545 | 439 | 545 |
| Potassium Carbonate | 228 | 228 | 112 | 228 |
| Batch Smelt Final Temperature in °F. (°C.) (after 14 minutes) | | | | |
| | 1980° F. | 2000 | 2020 | 2000 |
| | (1082° C.) | (1093) | (1104) | (1093) |
| Flowidity, in inches | | | | |
| | 11¾ | 9¾ | 8¼ | 11 |
| Fusion Range of the Vitrifaction in °F. (°C.) | | | | |
| | (1750 | (1725 | (1875 | (1725 |
| | 1825° F.) | 1800) | 1950) | 1825) |
| | (954°– | (941– | (1024– | (941– |
| | 996° C.) | 982) | 1066) | 996) |
| Alumina Dissolution Kinetics, in seconds | | | | |

| Example | 25 | 26 | 27 | 28 |
|---|---|---|---|---|
| | 247 | 150 | 320 | 270 |

The properties of these frits indicate that they would be useful for fluxing aluminum-killed steel.

EXAMPLES 29-34, inclusive

This group of six frits differed from the previous examples by the limitation on the amount of fluorine-providing material, including in some examples an absence of fluorine-providing material. All of the following examples showed a batch smelt final temperature of 2300° F. (1260° C.) (after 14 minutes). The examples were prepared by conventionally dry-mixing, fusing, and water quenching conventional raw batch ingredients listed to yield frits of the following theory analysis.

| Example | 29 | 30 | 31 | 32 | 33 | 34 |
|---|---|---|---|---|---|---|
| Oxides (Percent by Weight) | | | | | | |
| $K_2O$ | 2.1 | 2.3 | 2.5 | 2.1 | 5.0 | 5.0 |
| $Na_2O$ | 17 | 18.2 | 20.2 | 16.4 | 14.3 | 14.2 |
| CaO | 37.0 | 35.8 | 33.9 | 37.7 | 37.8 | 33.0 |
| F | 2.4 | 1.6 | 0.6 | 2.4 | 0 | 0 |
| $SiO_2$ | 34.8 | 35.8 | 38.5 | 33.7 | 23.8 | 23.8 |
| $B_2O_3$ | 6.6 | 6.4 | 4.9 | 7.6 | 19.1 | 19.1 |
| MgO | — | — | — | — | — | 4.9 |
| Raw Batch Composition Ingredients (Weight Parts) | | | | | | |
| Silica | 895 | 911 | 960 | 869 | 551 | 567 |
| Sodium Carbonate | 620 | 665 | 766 | 574 | 230 | 236 |
| Fluorspar ($CaF_2$) | 176 | 115 | 40 | 174 | 0 | 0 |
| Borax | 245 | 236 | 177 | 283 | 643 | 662 |
| $CaCO_3$ | 1484 | 1487 | 1464 | 1522 | 1607 | 1142 |
| Potassium Carbonate | 80 | 85 | 92 | 77 | 170 | 175 |
| Magnesia | — | — | — | — | — | 118 |
| Flowidity, in inches | 5¾ | 5½ | 3¼ | 4¼ | 8¼ | 8¼ |
| Fusion Range of the Vitrifaction (°F.) (°C. below) | (1950 2100° F.) (1066°– 1149° C.) | (2000 2150) (1093– 1177) | (2100 2200) (1149– 1204) | (1900 2100) (1037– 1149) | (1925 2000) (1052– 1093) | (1850 1950) (1010– 1066) |
| Alumina Dissolution Kinetics, in seconds | 360 | 445 | 600 | 453 | 380 | 300 |

EXAMPLES 35-38, inclusive

These additional frits were like Examples 29-34 in that the fluorine-providing material was limited. Again, the batch smelt final temperature for all four examples was 2300° F. (1260° C.) (after 14 minutes). The examples were prepared by conventionally dry-mixing, fusing, and water quenching conventional raw batch ingredients listed to yield frits of the following theory analysis:

| Example | 35 | 36 | 37 | 38 |
|---|---|---|---|---|
| Oxides (Percent by Weight) | | | | |
| $K_2O$ | 3.0 | 2.3 | 1.8 | 2.0 |
| $Na_2O$ | 23.7 | 18.2 | 14.2 | 15.8 |
| CaO | 29.4 | 35.9 | 29.4 | 40.3 |
| F | 3.2 | 2.5 | 3.2 | 3.5 |
| $SiO_2$ | 32 | 33.8 | 42.8 | 30.8 |
| $B_2O_3$ | 8.6 | 6.8 | 8.7 | 7.7 |
| Raw Batch Composition Ingredients (Weight Parts) | | | | |
| Silica | 837 | 865 | 1178 | 796 |
| Sodium Carbonate | 892 | 683 | 495 | 544 |
| Fluorspar ($CaF_2$) | 174 | 139 | 188 | 249 |
| Borax | 328 | 251 | 342 | 288 |
| $CaCO_3$ | 1150 | 1471 | 1220 | 1549 |
| Potassium Carbonate | 119 | 91 | 77 | 75 |
| Flowidity, in inches | 5¾ | 4¾ | 3½ | 6¼ |
| Fusion Range of the Vitrifaction in °F. (°C.) | (1875°– 2000° F.) (1024– 1093° C.) | (1975– 2100) (1079– 1149) | (1400– 2050) (760– 1121) | (1925– 2050) (1052– 1121) |
| Alumina Dissolution Kinetics, in seconds | 660 | 780 | 255 | 315 |

EXAMPLES 39-42, inclusive

This final group of four particulate slagging composition were not frits, but instead were mold powders. Each example had the same theoretical net oxide analysis and the same raw batch composition ingredients as its sequentially preceding example in Examples 35-38, i.e., Example 39 has the same analysis and ingredients as Example 35, 40 as 36, 41 as 37, and 42 as 38. These examples were prepared by intimately mechanically blending of the particulate raw batch components, none of which were greater than about 100 mesh in size (Tyler Sieve Series). The blends were not heated. The blend examples displayed the following characteristics:

| Example | 39 | 40 | 41 | 42 |
|---|---|---|---|---|
| Flowidity, in inches | 6¾ | 5½ | 3¾ | 6¼ |
| Fusion Range of the Mold Powder in °F. (°C.) | (1825°– 1950° F.) (996– 1066° C.) | (1975– 2050) (1079– 1121) | (1650– 1875) (899– 1024) | (1950– 2050) (1066– 1121) |
| Alumina Dissolution Kinetics, in seconds | 420 | 435 | 390 | 360 |

The special test procedure used to determine the fusion ranges in the previous examples required weighing out 3.00 grams of the sample composition. A weighed-out sample was put into a pellet mold that would produce a ½-inch (1.27 cm.) diameter pellet in cylindrical form. The mold was then put into a hydraulic press and subjected to a pressure of 5,000 pounds per square inch (350 kg./cm²). The pellet formed from the sample material was placed in the center of a stainless steel plate, ½-inch (1.27 cm.) thick and 2 inches (5.08 cm.) by 2 inches (5.08 cm.) square. The plate with the pellet on it was then placed in a furnace capable of supporting the plate in a precisely level position (to avoid the melted composition from running off the plate). The furnace was also capable of maintaining preselected temperatures between 1500° F. (1816° C.) and 2300° F. (1260° C.). The sample was left in the furnace for exactly 3½ minutes.

Upon removal, the pellet was examined for any evidence of softening, primarily rounding of the edges. If there were such signs, the furnace temperature was taken as the lower fusion range temperature. If there were no such signs, the furnace temperature was increased by 50° F. (17.8° C.) and a new pellet was heated at the new temperature for exactly 3½ minutes. After the lower fusion range temperature was determined, the furnace temperature continued to be increased by 50° F. (17.8° C.) intervals until the upper fusion range temperature was determined. The upper temperature was evidenced by the sample flowing out into a thin melt, i.e. a puddle that had lost all cylindrical form.

The special test procedure used to determine alumina dissolution kinetics required the preparation of a graphite crucible without any drain holes. The crucible was prepared by boring a 1½ inch- (3.76 cm.) diameter by 5 inches (12.70 cm.) deep hole in a 3-inch (7.62 cm.) diameter by 6 inches (15.24) in length pure graphite electrode. Alumina tubing having an outer diameter of 3/32-inch (0.25 cm.) and an inner diameter of 1/32-inch (0.092 cm.) was cut into a ¾-inch (1.89 cm.) segment with an abrasive-coated cut-off wheel. To hold the alumina tubing segment, a 3/16-inch (0.48 cm.) diameter horizontal hole was drilled ¼ inch (0.64 cm.) from the bottom of a rod 0.31 inches (0.8 cm.) in diameter and 8.07 inches (20.5 cm.) in length made from electrode grade graphite.

A sample of 250 grams of the composition to be tested was placed in the crucible. The crucible was heated to a temperature of 2600° F. (1427° C.) by a 7.5 KW Lepel induction furnace. While the crucible was being heated, the graphite rod containing the alumina sample was suspended over the crucible. This insured a proper warm-up period which reduced the possibility of the alumina tube fracturing upon submersion into the composition. However, the alumina was sufficiently far enough above the melting composition to avoid contact with any accidental splashes of composition such that would lead to premature alumina dissolution.

When the crucible had reached the 2600° F. (1427° C.) temperature according to an optical pyrometer reading, the sample was submerged. Within 30 seconds or less, the graphite rod was withdrawn to check if the alumina sample had fractured. Sharp irregular breaks usually near the sample tip would have indicated fracture and the necessity to start the procedure again from the beginning. If no fracturing was evident, the sample was resubmerged. At 15-second intervals, the rod was withdrawn to see if dissolution had occurred. Dissolution occurred when no alumina remained in the rod. The test was run three timees for each sample so that an average value could be calculated as the reported test result.

In conclusion, the differences in composition between the instant application and its parent, Ser. No. 897,717, stem from continued detailed exploration of the extremes of compositional ranges and the practicality of vitrifying totally new mixes right in the steel casting operation as well as in a smelter to obtain vitrifaction earlier. Thus, some relatively minor but useful changes were found, e.g. in the calcia content, and few major ones such as the possibility of lowering and actually eliminating fluorine also have been set forth.

Also, as can be readily understood, the use of raw batch materials for direct use in steel casters (as distinguished from slagging compositions that are previtrifified in smelters prior to their use such casters) is best limited to those materials which will not be highly hazardous to handle, highly hydroscopic, or give off large amounts of noxious fumes from the casters. Thus, wollastinite is preferable to calcium carbonate for supplying some of the calcia and silica to such raw batch materials. Also sodium fluoride, rat poison, should be avoided in mold powders in favor of the water insoluble fluorspar ($CaF_2$).

What is claimed is:

1. A particulate slagging composition comprising glass network formers and fluxing agents therefor, said compositions characterized by the absence of lithium, and the flowidity and fusion range upon melting suitable for the continuous casting of a steel, the theoretical net oxide analysis values of said composition being within the following ranges:

| Oxide | Weight Percent | |
|---|---|---|
| $K_2O$ | 0.5–6 | with the proviso that the weight ratio of $K_2O/Na_2O$ is between 1:2.5 and 1:20 and the Group 1A metal oxides do not exceed 35% |
| $Na_2O$ | 10–30 | |
| CaO | 20–41 | with the proviso that the Group 2A metal oxides do not exceed 41% |
| MgO | 0–10 | |
| BaO | 0–5 | |
| SrO | 0–5 | |
| $TiO_2$ | 0–4 | |
| $ZrO_2$ | 0–3 | |
| Oxide of a Period IV. metal having atomic No. of 23–28, inclusive | 0–6 | |
| F (elemental component of the fluorine-providing materials) | 0–16 | |
| $SiO_2$ | 25–45 | with the proviso that these glass network formers do not exceed 45 percent |
| $B_2O_3$ | 0–10 | |
| $Al_2O_3$ | 0–8 | | wherein the percentages are selected to total 100%.

2. The particulate slagging composition of claim 1 which has from 0–1% alumina, and the alumina dissolution kinetics value not in excess of 500 seconds.

3. The particulate slagging composition of claim 1 which has 1–7% alumina.

4. The particulate slagging composition of claim 1 which is vitrifaction.

5. The particulate slagging composition of claim 1 which is partially vitreous.

6. The composition of claim 5 which contains fluorine, there being not more than about 5% fluorine in the vitreous portion of said composition and the remainder being in the form of unvitrified particles of fluorine-providing material.

7. The particulate slagging composition of claim 1 which has been intimately blended to form a mold powder, but has not been vitrified.

8. The particulate slagging composition of claim 1 wherein there is admixed about 1–10% of finely divided carbon particles.

9. In a process for the continuous casting of a steel wherein a pool of molten steel is maintained in the upper end of an open-ended continuous casting mold, the improvement which comprises establishing and maintaining on the top of said pool a protective layer of the particulate slagging composition of claim 1.

10. In a process for the continuous casting of a steel wherein a pool of molten steel is maintained in the upper end of an open-ended continuous casting mold, the improvement which comprises establishing and maintaining on the top of said pool a protective layer of the particulate slagging composition of claim 8.

11. The particulate slagging composition of claim 1 which has the following theoretical net oxide analysis values in weight percent: 0.9 $K_2O$, 11.8 $Na_2O$, 34.8 CaO, 11.2 F, 30.8 $SiO_2$, 7.2 $Al_2O_3$, 1.0 MgO, 2.3 $Fe_2O_3$.

12. The particulate slagging composition of claim 1 which has the following theoretical net oxide analysis values in weight percent: 2.8 $K_2O$, 24.4 $Na_2O$, 26.2 CaO, 12.0 F, 34.4 $SiO_2$, 0.07 $Al_2O_3$, 0.14 MgO.

13. The particulate slagging composition of claim 1 which has the following theoretical net oxide analysis values in weight percent: 5.9 $K_2O$, 23.7 $Na_2O$, 27.9 CaO, 11.4 F, 30.8 $SiO_2$.

14. The particulate slagging composition of claim 1 which has the following theoretical net oxide analysis values in weight percent: 2.0 $K_2O$, 15.8 $Na_2O$, 40.3 CaO, 3.5 F, 30,8 $SiO_2$, 7.7 $B_2O_3$.

* * * * *